(12) United States Patent
Andreoli et al.

(10) Patent No.: US 7,567,946 B2
(45) Date of Patent: Jul. 28, 2009

(54) METHOD, APPARATUS, AND ARTICLE OF MANUFACTURE FOR ESTIMATING PARAMETERS OF A PROBABILITY MODEL ON SHARED DEVICE USAGE PROBABILISTIC SEMANTIC ANALYSIS

(75) Inventors: Jean-Marc Andreoli, Meylan (FR); Guillaume Bouchard, Bernin (FR)

(73) Assignee: Xerox Corporation, Norwalk, CT (US)

( * ) Notice: Subject to any disclaimer, the term of this patent is extended or adjusted under 35 U.S.C. 154(b) by 777 days.

(21) Appl. No.: 11/137,565

(22) Filed: May 26, 2005

(65) Prior Publication Data

US 2006/0206445 A1 Sep. 14, 2006

Related U.S. Application Data

(60) Provisional application No. 60/660,993, filed on Mar. 14, 2005.

(51) Int. Cl.
*G06F 17/00* (2006.01)
*G06N 5/02* (2006.01)
(52) U.S. Cl. .......................................... 706/46; 706/12
(58) Field of Classification Search .................... 706/46, 706/12
See application file for complete search history.

(56) References Cited

U.S. PATENT DOCUMENTS

| | | | |
|---|---|---|---|
| 6,345,265 B1 | 2/2002 | Thiesson et al. | |
| 6,529,286 B1 | 3/2003 | King | |
| 7,328,216 B2 * | 2/2008 | Hofmann et al. | 707/100 |
| 7,383,258 B2 * | 6/2008 | Harik et al. | 707/5 |
| 2003/0184799 A1 | 10/2003 | Ferlitsch | |
| 2009/0094380 A1 * | 4/2009 | Qiu et al. | 709/239 |

FOREIGN PATENT DOCUMENTS

| | | |
|---|---|---|
| EP | 1197840 A2 | 4/2002 |
| EP | 1197840 A3 | 9/2005 |
| FR | 1 197 840 A2 * | 4/2001 |

OTHER PUBLICATIONS

H. Akaike, "A new look at statistical model identification", IEEE Transactions on Automatic Control, 19:716-723, 1974.

(Continued)

*Primary Examiner*—David R Vincent
*Assistant Examiner*—Liwu Chang
(74) *Attorney, Agent, or Firm*—Fay Sharpe LLP

(57) ABSTRACT

Methods are disclosed for estimating parameters of a probability model that models user behavior of shared devices offering different classes of service for carrying out jobs. In operation, usage job data of observed users and devices carrying out the jobs is recorded. A probability model is defined with an observed user variable, an observed device variable, a latent job cluster variable, and a latent job service class variable. A range of job service classes associated with the shared devices is determined, and an initial number of job clusters is selected. Parameters of the probability model are learned using the recorded job usage data, the determined range of service classes, and the selected initial number of job clusters. The learned parameters of the probability model are applied to evaluate one or more of: configuration of the shared devices, use of the shared devices, and job redirection between the shared devices.

18 Claims, 7 Drawing Sheets

OTHER PUBLICATIONS

H. Bensmail, G. Celeux, A. Raftery, and C. Robert, "Inference in model-based cluster analysis", Statistics and Computing, 7:1-10, 1997.

S. Deerwester, S.T. Dumais, G.W. Furnas, T.K. Landauer, and R. Harshman, "Indexing by latent semantic analysis", Journal of the American Society for Information Science, 1990.

A. Dempster, N. Laird, and D. Rubin, "Maximum likelihood from incomplete data via the EM algorithm", Journal of the Royal Statistical Society, B 39:1-38, 1977.

M. Evans, Z. Gilula, and I. Guttman, "Latent class analysis of two-way contingency tables by Bayesian methods", Biometrika, 76(3):557-563, 1989.

E. Gaussier and C. Goutte, "Probabilistic models for hierarchical clustering and categorisation, Applications in the information society", Proceedings of the Intl. Conf. on Advances in Infrastructure for Electronic Business, Education, Science and Medicine on the Internet, L'Aquila, Italy, 2002.

T. Hofmann, "Probabilistic latent semantic analysis", Proc. of Uncertainty in Artificial Intelligence, UAI'99, Stockholm, 1999.

T. Hofmann and J. Buhmann, "Pairwise data clustering by deterministic annealing", IEEE Transactions on Pattern Analysis and Machine Intelligence, 19(1):1-14, 1997.

T. Hofmann and J. Puzicha, "Statistical models for co-occurrence data", Technical Report 1625, MIT, 1998.

E.O. Heiermann III and D.J. Cook, "Improving home automation by discovering regularly occurring device usage patterns", Proceedings of the 3rd IEEE International Conference on Data Mining (ICDM 2003), Melbourne, Florida, USA, pp. 537-540, 2003.

X. Jin, Y. Zhou, and B. Mobasher, "Web usage mining based on probabilistic latent semantic analysis", Proceedings of the ACM SIGKDD Conference on Knowledge Discovery and Data Mining (KDD'04), Seattle, 2004.

J. W. Sammon, "A nonlinear mapping for data structure analysis", IEEE Transactions on Computers, 18(5):401-409, 1969.

G. Schwartz, "Estimating the dimension of a model", The Annals of Statistics, 6(2):461-464, 1978.

J. Srivastava, R. Cooley, M. Deshpande, and P-N, Tan, "Web usage mining: Discovery and applications of usage patterns from web data", SIGKDD Explorations, 1(2):12-23, 2000.

L. H. Ungar and D. P. Foster, "Clustering methods for collaborative filtering", Proc. of the AAAI Workshop on Recommendation Systems, 1998.

U.S. Appl. No. 11/013,322, entitled "Automated Job Redirection And Organization Management", filed Dec. 17, 2004.

European Search Report for EPO Counterpart Application No. EP 06 11 1104, Jul. 25, 2006.

* cited by examiner

| Cluster | B&W Printer | Color Printer | % | User IDs (% of usage) | | | | |
|---|---|---|---|---|---|---|---|---|
| C1 | Pre(99%) | Lib(98%) | 12.7 | ej(13%) | cu(9%) | bw(8%) | cm(8%) | el(8%) |
| C2 | Stu(100%) | Lib(100%) | 10 | be(16%) | ds(9%) | cp(7%) | au(7%) | dc(6%) |
| C3 | Tim(85%) | Ver(99%) | 15.6 | db(9%) | ar(9%) | bm(8%) | az(8%) | er(7%) |
| C4 | Vog(99%) | Rep(52%) | 13.8 | cg(25%) | aw(20%) | ei(18%) | dy(15%) | ep(4%) |
| C5 | Hol(100%) | Lib(100%) | 7.7 | ch(51%) | ay(31%) | bs(13%) | ec(2%) | bw(0%) |
| C6 | Her(98%) | Tel(98%) | 7 | ef(26%) | dq(18%) | ce(11%) | dt(10%) | dm(8%) |
| C7 | Geo(97%) | Ver(96%) | 5.6 | ac(65%) | bv(31%) | dx(2%) | eq(0%) | ec(0%) |
| C8 | Bib(99%) | Rep(100%) | 6.8 | ag(42%) | bu(38%) | dh(10%) | ec(9%) | et(0%) |
| C9 | Mes(73%) | Ver(84%) | 4.5 | dx(72%) | em(26%) | ba(0%) | do(0%) | bt(0%) |
| C10 | Lem(97%) | Rep(100%) | 3.5 | an(92%) | ei(5%) | et(1%) | ch(0%) | bt(0%) |
| C11 | Hod(89%) | Ver(69%) | 5.5 | eq(20%) | et(14%) | cy(13%) | cc(12%) | ek(9%) |
| C12 | Mid(76%) | Fig(91%) | 1.7 | da(99%) | ba(0%) | do(0%) | dx(0%) | em(0%) |
| C13 | Sta(99%) | Tel(95%) | 5.6 | av(12%) | de(10%) | ea(10%) | bh(8%) | cz(8%) |

FIG. 7

METHOD, APPARATUS, AND ARTICLE OF MANUFACTURE FOR ESTIMATING PARAMETERS OF A PROBABILITY MODEL ON SHARED DEVICE USAGE PROBABILISTIC SEMANTIC ANALYSIS

CROSS REFERENCE TO RELATED APPLICATION

Priority is claimed from U.S. Provisional Application No. 60/660,993, filed Mar. 14, 2005, entitled "Probabilistic Modeling Of Shared Device Usage", by the same inventors and assignee, which is incorporated herein by reference.

BACKGROUND AND SUMMARY

The following relates generally to methods, apparatus and articles of manufacture therefor, for estimating parameters of a probability model that models user behavior of shared devices offering different classes of service for carrying out jobs. Once its parameters are estimated, the probability model is used in applications for detecting outliers, evaluating shared infrastructure needs, and initializing configuration settings.

Shared devices, such as multifunctional devices (e.g., devices with functions for printing, scanning, and/or faxing), commonly operate today as a network resource that is shared amongst a plurality of users, in for example, an office or a home environment. Such shared devices offer advantages over dedicated devices (e.g., a device to which access is limited to a user) by possibly offering a wider range of service classes that may vary in operating cost (e.g., TCO—total cost of ownership), quality, and performance, as well as, redundant services in the event of failure.

System administrators managing shared devices commonly collect information about how an infrastructure of shared devices is used. Such information may be presented to system administrators through statistics that identify information such as the total number of functions performed (e.g., total number of pages printed), which may be filtered by individual devices or groups of devices (e.g., devices having the same range of functionality, operating cost, quality, performance, etc.) or geographical location (building, work unit, etc.). Further, such information may be used by system administrators to identify or anticipate problems, anticipate changing user needs, provide assistance to users, and provide initial configuration settings.

While many shared devices record usage job data (e.g., print job logs) that include data that identifies a user identity attached to each requested job, the use of such recorded usage information by system administrators managing the shared devices generally tends to be either device-centric (i.e., focused on aspects about the device) or user-centric (i.e., focused on aspects about the user). Such device-centric or user-centric views may fail to consider other aspects forming part of the recorded usage data of shared devices, such as possible correlations between the two. For example, such device-centric and user-centric views may not take into account the attributes of users sending jobs to devices and the class of jobs performed on the devices.

In accordance with the disclosure herein, recorded device usage data is analyzed using a probabilistic latent model. The model characterizes each job using two observed variables (i.e., users and devices) and two latent variables (i.e., job clusters and job service classes). To carry out such an analysis, device and user information should be correlated and users should not be strongly constrained in their use (e.g., any user is allowed to print anything on any device in a device infrastructure). In one embodiment, once the parameters of the model are estimated, communities of device usage may be discovered, and, from these, suppositions concerning actual behavior of the users may be formed, both in the case of normal infrastructure operations and in case of exceptions (e.g., device down or not operating properly). In another embodiment, community and user information may be used to evaluate the organization of the infrastructure and to provide a set of initial conditions for a given user.

In accordance with the various embodiments disclosed herein, there is provided a method, apparatus and article of manufacture therefor, for estimating parameters of a probability model that models user behavior of shared devices offering different classes of service for carrying out jobs. The method comprises: recording usage job data of observed users and devices carrying out the jobs; determining a range of service classes associated with the shared devices; defining a probability model with an observed user variable, an observed device variable, a latent job cluster variable, and a latent job service class variable; selecting an initial number of job clusters; learning parameters of the probability model using the recorded job usage data, the determined range of service classes, and the selected initial number of job clusters; and applying the learned parameters of the probability model to evaluate one or more of: configuration of the shared devices, use of the shared devices, and job redirection between the shared devices.

BRIEF DESCRIPTION OF THE DRAWINGS

These and other aspects of the disclosure will become apparent from the following description read in conjunction with the accompanying drawings wherein the same reference numerals have been applied to like parts and in which:

FIG. 7 illustrates an example summary of estimated parameters for job clusters.

DETAILED DESCRIPTION

The table that follows sets forth definitions of terminology used throughout the specification, including the claims and the figures.

| Term | Definition |
| --- | --- |
| Job | An interaction between a user and a device for carrying out a selected function (e.g., printing). |
| Multifunction Device | A device that is adapted to perform one or more functions, such as, faxing, printing, scanning, emailing, and archiving. |

-continued

| Term | Definition |
| --- | --- |
| Service class | A level of service that a device offers, such as for printing, one or more of black and white and color printing. |
| Device | A machine adapted to carry out a job using a specified service class (e.g., a color printer). |
| Infrastructure | An organization of shared devices offering a plurality of service classes for carrying out jobs invoked by users. |

A. Operating Environment

Figure 1:
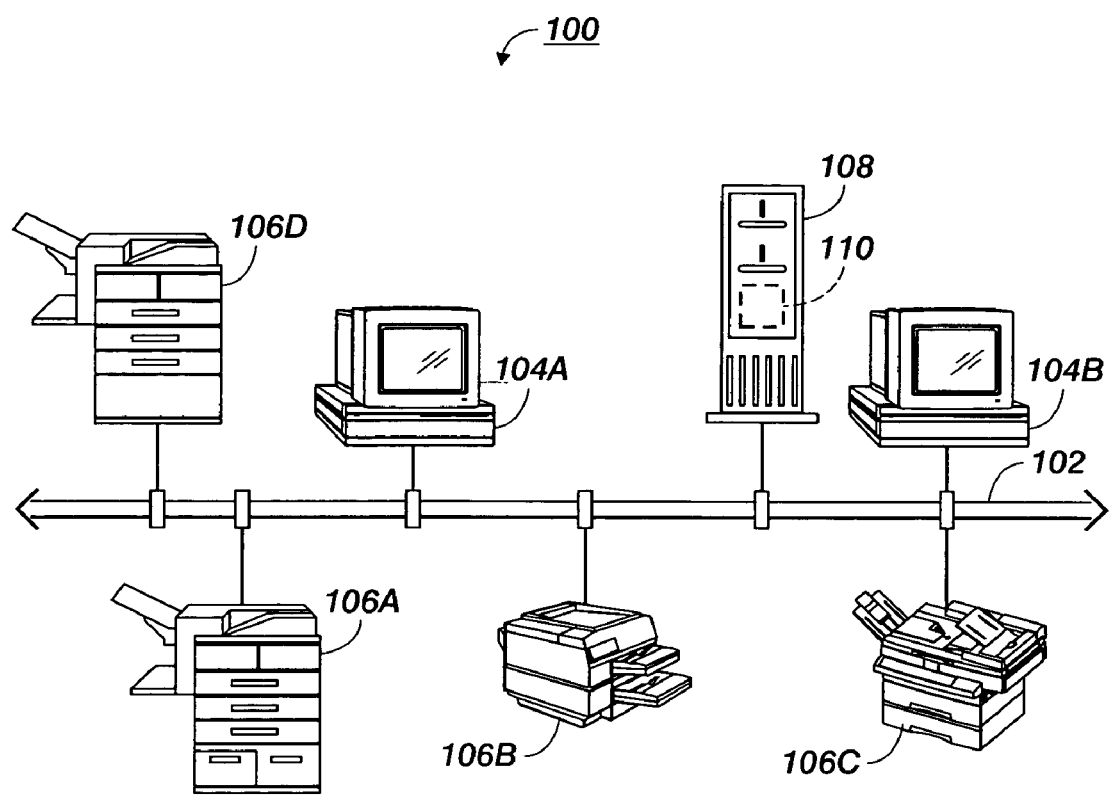
FIG. 1 is a simplified diagram showing one context in which the embodiments described herein may operate.

FIG. 1 is a simplified diagram showing one context in which the embodiments described herein may operate. In FIG. 1, there is provided a network 102 with an organization of shared network resources familiar in the art. Existing on this network 102 are, for purposes of the embodiments, a plurality of computers, such as here labeled 104A and 104B, and a plurality of multifunction devices, such as here labeled 106A, 106B, 106C, and 106D. There may further be provided on network 102 what is known as a print server 108, which acts as a virtual device to which all or some print requests on a network may be spooled before being sent to a physical device. In the embodiment shown in FIG. 1, the print server operates using a probabilistic latent analysis system 110, which analyzes logged usage data for later performing the operations shown in FIG. 2.

In other embodiments described herein, the computers 104 and/or printers 106 and/or print server 108 have operating within one or more of them, in a centralized or decentralized manner, an automated print redirection and/or organization management system as described herein. Also, the word "printer" may for present purposes mean not only a printer, but any kind of device having printer-like features and/or functions and/or operational qualities (e.g., that operates as a shared resource on the network 102), such as a multifunction device (which includes one or more functions such as scanning, printing, archiving, emailing, and faxing), or a standalone device such as digital copier, input scanner, facsimile.

In yet other embodiments, any one or more of the computers 104 in FIG. 1 may be the computer of a systems administrator responsible for the activities of some or all of the printers on network 102. Such responsibilities may, for example, include making sure that a certain number of printers are available and operating on the network 102, making sure the printers 106 on network 102 are of particular types, making sure that the installed printers are appropriately selected for the needs of the organization, making sure users are given an initial set of attributes for operating the printers, and making sure that in the event a printer becomes temporarily unavailable there are alternate printers identified to which print jobs destined to the unavailable printer may be redirected.

Figure 2:
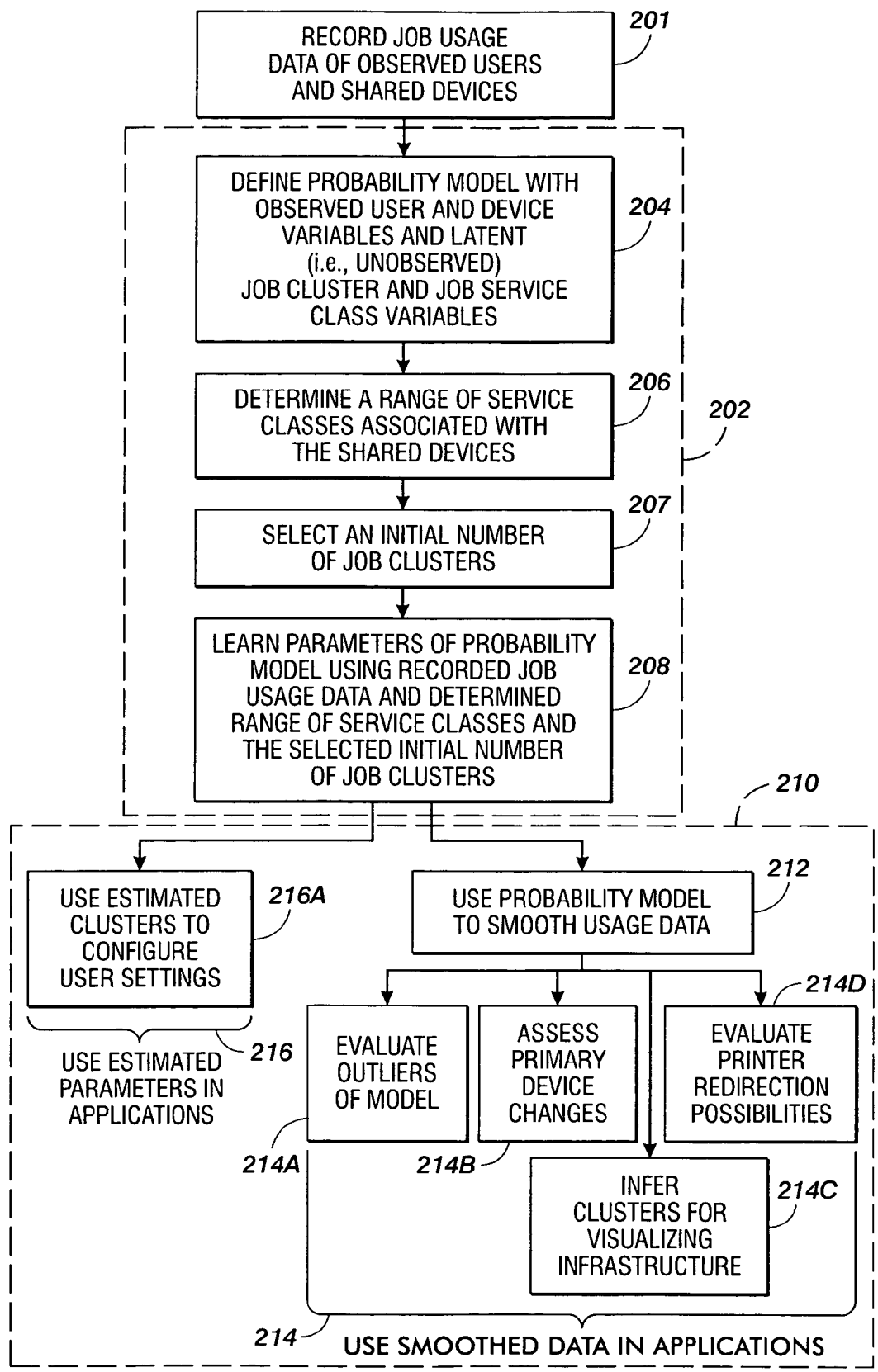
FIG. 2 is a flow diagram of the operations performed by the probabilistic latent analysis system shown in FIG. 1.

In accordance with the embodiments disclosed herein, a system administrator may evaluate the printers available on the network of an organization and determine: (a) individual needs when it appears that some needs are not met; (b) what would be the best printer to redirect a print job to when another printer becomes temporarily unavailable on the network; (c) differences between observed and predicted user behavior; (d) an initial set of configuration parameters of a user; and (e) clusters for defining a network topology for evaluating print use on the network. Such management of the printers is performed by the probabilistic latent analysis system 110, which may operate from one or a combination of the printers 106, the computers 104, and the print server 108. FIG. 2 is a flow diagram of the operations performed by the probabilistic latent analysis system 110, which includes operations for: (a) recording job usage data (or retrieving it if previously recorded), at 201, of observed users and shared devices, (b) developing a probability model at 202, and (c) using the developed probability model, at 210.

Depending on the embodiment in which the probabilistic latent analysis system 110 operates, job usage data may be recorded (or retrieved from one or more recording facilities) from any one or a combination of the printers 106 and print servers 108. In one embodiment, job usage data is retrieved from job log data recorded at the printers 106. In an alternate embodiment, recorded job usage data is a recorded job log data stored, for example, on a centralized job spooler or print server 108. In yet another embodiment, job usage data is accumulated individually by printers 106 operating on the network 102 through a distributed exchange of information (e.g., via a defined negotiation protocol).

B. Developing The Probability Model

This section describes the aspects related to the operations for developing a probability model, at 202 shown in FIG. 2. By way of overview, in developing a probability model, the model is defined, at 204, with observed user and device variables and latent (i.e., unobserved) job cluster and job service class variables. At 206, a range of service classes that is associated with the shared devices is determined, for which job usage data is recorded at 201. At 207, an initial number of job clusters is selected. Finally at 208, parameters of the probability model defined at 204 are learned using the job usage data recorded at 201, the range of service classes determined at 206, and the initial number of clusters selected at 207. The details of operations performed at 204, 206, 207, and 208 are more fully described in the following sections below: B.1 (Probability Model Background), B.2 (Model Variables), B.3 (Model Likelihood), B.4 (Learning The Number Of Clusters), B.5 (Parameter Estimation Initialization), and B.6 (Parameter Estimation).

B.1 Probability Model Background

At 202 in FIG. 2, a probability model is developed for analyzing usage data in an infrastructure consisting of a set independent devices offering services of different or identical classes, where the set of independent devices are shared and operated by a set of independent users. An interaction between a user and a device is defined herein as a job. The usage data consists of a log of jobs that have been recorded over a given period of time. In one embodiment, the probability model is defined at 204 while taking into account the following assumptions:

(A) The number of users, devices and service classes, is given by $N_U$, $N_D$, and $N_K$, respectively, which are assumed to be invariable over an analyzed period. Each user, device, and service class, may be identified by the numbers $u \in \{1, \ldots, N_U\}$, $d \in \{1, \ldots, N_D\}$, and $k \in \{1, \ldots, N_K\}$, respectively. In one embodiment, each numbered user, device, and service class may in addition be associated with a name, for reference purposes.

(B) Each device may offer services of one or more classes, which is represented using a boolean matrix f of dimension $N_K \times N_D$, where element $f_{kd}$ of the boolean matrix f equals one if device d offers the service class k and zero otherwise. The boolean matrix f is assumed to be static over the analyzed period.

(C) All the jobs are recorded over the analyzed period, where n is the number of jobs recorded over the analyzed period. Each job recorded over the analyzed period is identified by an index $i \in \{1, \ldots, n\}$. Each job i contributes exactly one entry in the job usage data recorded at 201, consisting of the pair ($u_i$, $d_i$) identifying the user and device, respectively, involved in that job, where the use of a numerical index i does not convey any ordering of the jobs. While this embodiment does not account for the temporal ordering of the jobs, as could be inferred from a time stamp feature in each entry recorded in the job usage data, it will be appreciated that other embodiments may account for this temporal aspect.

In one embodiment, the probability model is applied to a printing infrastructure in an environment with multiple users (such as an office). Following this embodiment, the service class is given by particular types of printing. For example, in one particular environment devices may offer two classes of service, black and white printing (k=1) or color printing (k=2). It will be appreciated that devices with the ability to perform classes of jobs with color printing may also perform classes of jobs that are limited to black and white printing, which means that if the element $f_{2d}$ of the boolean matrix f is equal to one, then the element $f_{1d}$ of the boolean matrix f is also equal to one.

In alternate embodiments, the probability model may be designed to take into account other types of information concerning: users (e.g., the position or location of users, the hierarchical relations between users), devices (e.g., the location of devices), jobs (e.g., the type or size of job, the time a job is submitted and completed), or events (e.g., activity concerning print spoolers, internal state of devices). It will be appreciated by those skilled in the art that other than time-dependent information, such additional information may be readily incorporated in the probability model defined herein.

One purpose for developing the probability model, at 202, is to discover a set of job clusters in the usage data recorded at 201, which job clusters may be identified by a number $c \in \{1, \ldots, N_C\}$. The clusters may be discovered using latent class models that may be used to find relevant patterns in high-dimensional data, such as mixture models (for background see for example, the following publication which is incorporated herein by reference in its entirety: H. Bensmail, G. Celeux, A. Raftery, and C. Robert, "Inference in model-based cluster analysis", Statistics and Computing, 7:1-10, 1997) and co-occurrence models (for background see for example, the following publications which are incorporated herein by reference in their entirety: T. Hofmann, "Probabilistic latent semantic analysis", Proceedings of Uncertainty in Artificial Intelligence, UAI'99, Stockholm, 1999; and E. Gaussier and C. Goutte, "Probabilistic models for hierarchical clustering and categorisation: Applications in the information society", Proceedings of the International Conference on Advances in Infrastructure for Electronic Business, Education, Science and Medicine on the Internet, L'Aquila, Italy, 2002). In comparing the two models, co-occurrence models customize the usage behavior by allowing jobs from a single user to be clustered into different clusters, unlike mixture models.

Further, some model selection techniques may be applied to the mixture models and co-occurrence models to find the number of relevant clusters in the usage data recorded at 201 (for background see for example, the following publications which are incorporated herein by reference in their entirety: G. Schwartz, "Estimating the dimension of a model", The Annals of Statistics, 6(2):461-464, 1978; and H. Akaike, "A new look at statistical model identification", IEEE Transactions on Automatic Control, 19:716-723, 1974).

Table 1 represents how certain aspects of the probabilistic latent semantic analysis (PLSA) co-occurrence model for clustering textual data may be analogized to clustering usage data. In accordance with the probability model developed at 202, Table 1 sets forth a transformation from the "document as a bag of words" metaphor, in which raw data is in the form of an unordered set of co-occurrence document-words, to a "user as a bag of devices" metaphor, in which raw data is in the form of an unordered set of co-occurrence user-devices (i.e., jobs).

TABLE 1

| Text Data | Usage Data |
| --- | --- |
| Document | User |
| Word | Device |
| Occurrence of a word in a document | Use of a device by a user (i.e., a job) |

In one embodiment, the transformation set forth in Table 1 is applied to the probabilistic latent semantic analysis (PLSA) co-occurrence model for clustering textual data. The PLSA approach is particularly relevant to usage data mining as the basic assumption behind the model is that data may be generated according to a process that first selects a cluster, then selects a user and a device, in such a way that, conditionally to a cluster, the choice of user and device are independent. This means that there are communities of usage (i.e., the clusters) and that, within each community, all the users have the same perception of the infrastructure, so that their choices of devices are not dependent on their identities.

In the printing infrastructure embodiment, the assumptions applied to the PLSA transformation are reasonable as such communities typically arise from the geographical or organizational proximity of the devices and the users at the time the job is defined. Clustering using PLSA therefore may be used as a method for discovering communities of usage in the printing infrastructure embodiment. In alternate infrastructure embodiments, a similar PLSA transformation may be applied to other communities organized of users and devices for evaluating usage data.

The transformation set forth in Table 1 between text data and usage data is incomplete because the independence between user and device conditionally to a community does not mean that the community is only determined by the choice of device for a job. Another determiner, which should be accounted for, is the type of job. Typically, the choice of a printer for a black and white job or a color job will differ, even if the two jobs belong to the same community. Consequently, clustering of jobs in the printing infrastructure embodiment is subject to two hidden variables, or a two-factor latent structure:

(A) a community of usage, on which both user and device depend independently of each other; and (B) a service class, on which the chosen device depends and which depends on the user, since users may not have the same needs in terms of the services they use.

In this two-factor latent structure, the service class of a job imposes a constraint on the chosen device, that the device should offer at least that class of service. Further, it is assumed that users (statistically) do not mistakenly launch a job on a device not supporting the service class of a job.

B.2 Model Variables

In defining a probabilistic model at 204 in FIG. 2, jobs recorded in the job usage data at 201 are assumed to be independent and identically distributed. The probability model is defined at 204 with a set of four random variables, two of which are observed, user ID and device ID, and two of which are latent (i.e., unobserved), index of job cluster and index of job service class, as shown in Table 2.

TABLE 2

| Variable | Description | Type |
|---|---|---|
| U | User ID | Observed |
| D | Device ID | Observed |
| C | Index Of Job Cluster | Unobserved |
| K | Index Of Job Service Class | Unobserved |

Figure 3:
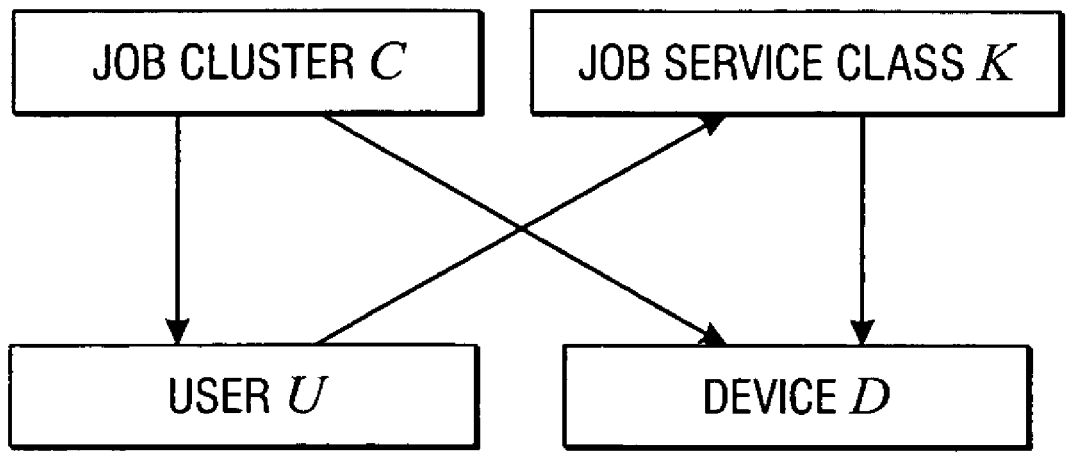
FIGS. 3 and 4 illustrate two graphical representations of probability model variables U, D, C and K and their dependencies.

FIG. 3 illustrates a first graphical representation of the probability model variables user U, device D, job cluster C and job service class K and their dependencies. As shown in FIG. 3 by the dependencies between variables, the variables may be instantiated according to the following four step generative process:

(1) Generate the job cluster index C, which has no dependencies;
(2) Generate the user id U, which is dependent on job clusters C;
(3) Generate the job service class K, which is dependent on the user U; and
(4) Generate the device choice D, which is dependent on the job clusters C and the job service classes K.

The four step generative process shown in FIG. 3 is equivalent to assuming that job cluster index C is independent of job service classes K conditionally to users U. Accordingly, one possible factorization of the joint distribution illustrated in the graphical model shown in FIG. 3 is given by:

$$p(U, D, C, K) = p(C)p(U|C)p(K|U)p(D|C, K). \quad [1]$$

where the cluster parameters of the multinomial distributions p(C) are defined as $\pi^{(C)}$ (i.e., a vector of proportions of dimension $N_C$ that sums to 1), and the other parameters (user, class, and device) are conditional discrete distributions p(U|C), p(K|U) and p(D|C, K) that are parameterized by the conditional probability tables $\pi^{(U)}$, $\pi^{(K)}$ and $\pi^{(D)}$, respectively.

The distribution of the devices is constrained by the knowledge of the service classes they support is given by:

$$f_{kd} = 0 \Rightarrow \forall c \ \pi_{dck}^{(D)} = 0.$$

Defining the set of parameters of the probability model as $\theta = \pi^{(C)} \pi^{(U)} \pi^{(K)} \pi^{(D)}$, the joint distribution defined at [1] may be given by:

$$p(U=u, D=d, C=c, K=k|\theta) = \pi_c^{(C)} \pi_{uc}^{(U)} \pi_{ku}^{(K)} \pi_{dck}^{(D)}.$$

Figure 4:
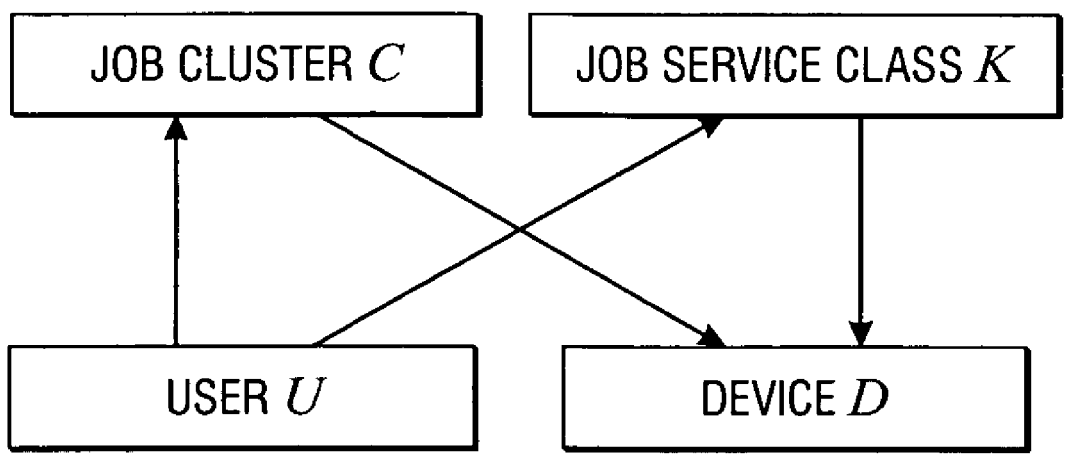

In an alternate embodiment of the generative process shown in FIG. 3, a second generative process may be given such that it starts with the choice of a user and then a cluster as shown in FIG. 4. In this alternate embodiment, the factorization of the joint distribution of the alternate generative process may be given by:

$$p(U, D, C, K) = p(U)p(C|U)p(K|U)p(D|C, K).$$

B.3 Model Likelihood

A fitness function that measures the accuracy of the relationship between the observed data (i.e., recorded job usage data) and the probability model given at [1] (with the set of parameters $\theta = \pi^{(C)} \pi^{(U)} \pi^{(K)} \pi^{(D)}$ chosen such that they maximize the fitness function), may be given by the probability of observing a user-device pair is a mixture of $N_C \times N_K$ distributions:

$$p(U, D|\theta) = \sum_{c=1}^{N_C} \sum_{k=1}^{N_K} p(C|\pi^{(C)}) p(U|C, \pi^{(U)}) p(K|U, \pi^{(K)}), \quad [2]$$

$$p(D|C, \pi^{(D)})$$

where the likelihood is the product of these probabilities over the n jobs observed in the job usage data. Hence, the log-likelihood of the whole observation x may be given by:

$$\log p(x|\theta) = \sum_{i=1}^{n} \log p(U=u_i, D=d_i|\theta), \quad [3]$$

where $p(U=u_i, D=d_i|\theta)$ represents the observed job usage data.

In a first embodiment, the maximum likelihood estimator at [3] is not always satisfactory when the number of jobs recorded in the usage log is small. That is, when prior knowledge is defined using uniform priors (i.e., $p(\theta)$=constant), it may occur that during the analyzed period, a given user u never performs jobs of a given service class k (e.g., never prints in color), in which case the maximum likelihood estimator at [3] will yield parameter $\pi_{ku}^{(K)}=0$, meaning that user u never uses service class k.

In a second embodiment, a satisfactory result may be achieved when the number of jobs recorded in the usage log is small if prior knowledge is available on the user's needs in terms of service classes, to compensate for insufficient data. Accordingly, a range of service classes associated with the shared devices may be determined at 206, where the a priori information is defined using informative priors. In one embodiment at 206, it is assumed a priori that the cluster parameter $\pi_{.u}^{(K)}$ for a user u is itself a random variable following a Dirichlet distribution, as follows:

$$\pi_{.u}^{(K)} \sim D((m_k)_{k=1, \ldots, N_K}),$$

where $N_K$ hyper-parameters $(m_k)_{k=1, \ldots, N_K}$ are introduced, and which may be seen as pseudo-counts of usage of each job service class given a priori for a "prototypical" user. For example, the $N_K$ hyper-parameters $(m_k)_{k=1, \ldots, N_K}$ may be defined using a percentage of jobs per service class or a count per service class. A Dirichlet distribution may be assumed for the a priori distribution of the remaining parameters $\pi^{(U)}$, $\pi^{(D)}$, $\pi^{(S)}$. In case hyper-parameters are not available, a uniform a priori distribution may be assumed (the advantage being that a uniform distribution does not require the consideration of hyper-parameters).

B.4 Learning the Number of Clusters

Figure 5A:
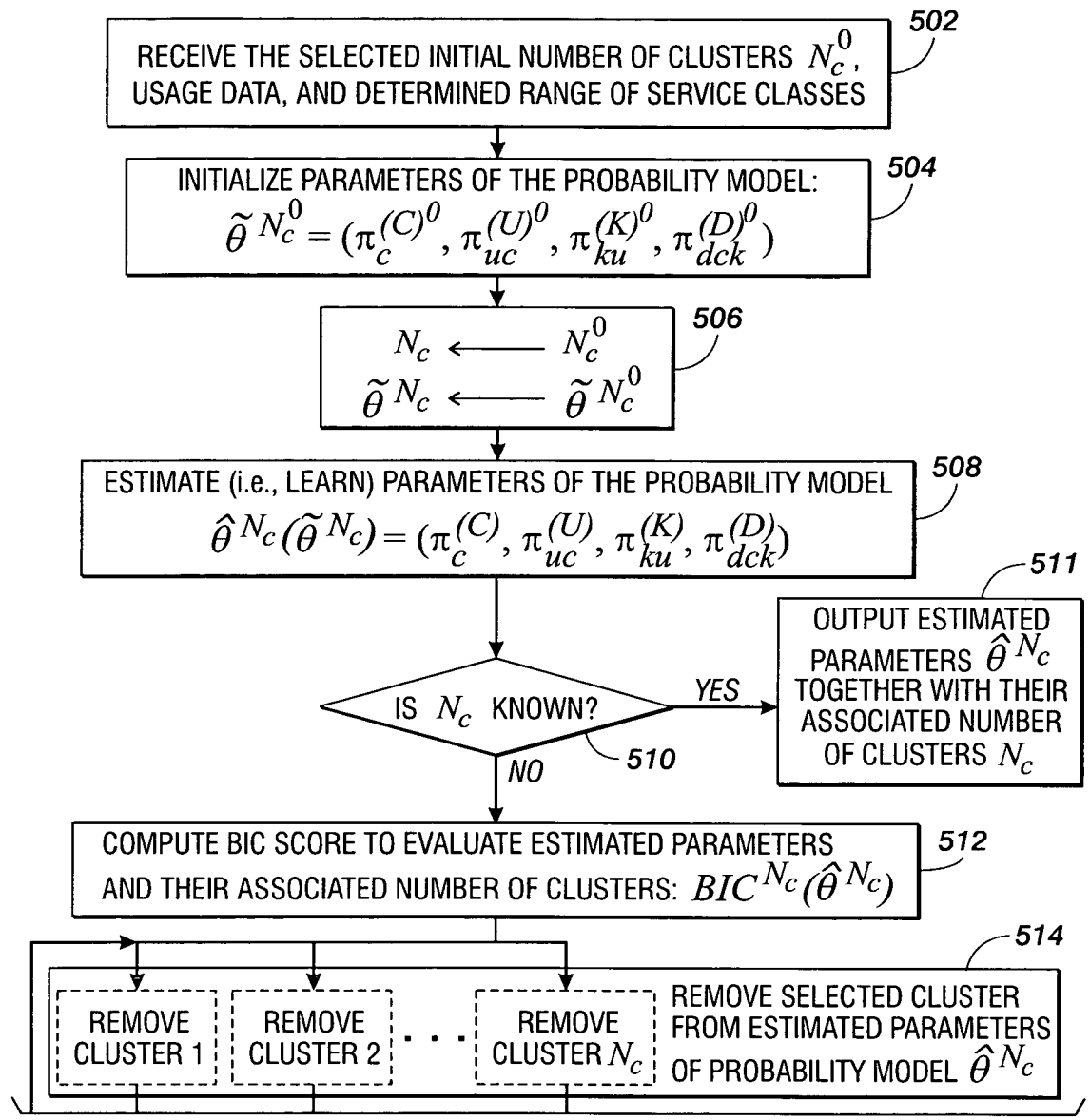
FIGS. 5A and 5B set forth a detailed flow diagram of a method for learning parameters and structure (e.g., number of clusters) of a probability model.
Figure 5B:
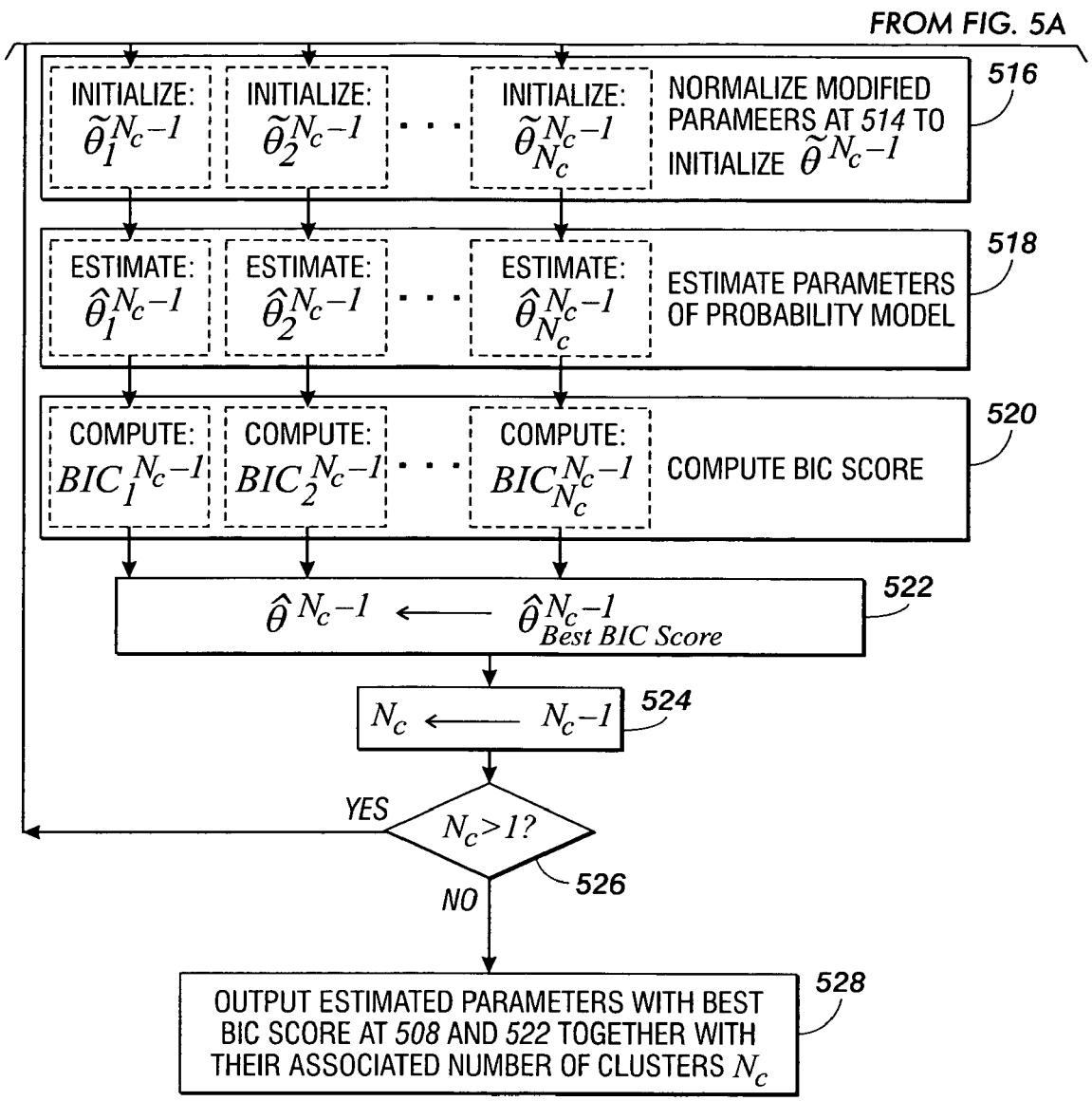

FIGS. 5A and 5B, which are discussed in detail below, set forth a detailed flow diagram of a method for learning parameters and structure (i.e., number of clusters) of the probability model indicated at 208 in FIG. 2, together with one embodiment for estimating the appropriate number of clusters. In one embodiment at 208, parameters U, D, C and K of the probability model at [1] are estimated by computing the maximum of the a posteriori probability (MAP) estimator, as follows:

$$\hat{\theta} = \underset{\theta}{\arg\max} \log(p(\theta|x)) = \underset{\theta}{\arg\max} \log(p(x|\theta)) + \log(p(\theta)),$$

which may be carried out using the iterative re-estimation formula of Expectation-Maximization ("EM"), as for example disclosed by A. P. Dempster, N. M. Laird, and D. B. Rubin, "Maximum Likelihood From Incomplete Data Via The EM Algorithm", J. Royal Statistical Society, Series B, 39(1):1-38, 1977, which is incorporated herein by reference in its entirety.

If the number of clusters $N_C$ is known (at 510 in FIG. 5A), the MAP estimator may be computed directly (at 508 in FIG. 5A) and output for use in applications (at 511 in FIG. 5A); however, if the number is unknown (at 510 in FIG. 5A), the MAP estimator is computed for each possible value of $N_C$ (at 518 in FIG. 5B), and a model maximizing the BIC score (computed at 512 in FIG. 5A and 520 in FIG. 5B) is selected (at 528 in FIG. 5B). (For background on what is referred to herein as the BIC solution in FIGS. 5A and 5B, see the publication from G. Schwartz, "Estimating The Dimension Of A Model", cited above.)

The BIC solution is used to choose the correct number of clusters, by computing a BIC score (at 512 FIG. 5A and 520 in FIG. 5B) which may be formally given by:

$$BIC(N_C) = \log p(x|\hat{\theta};N_C) + \log p(\hat{\theta};N_C) - \frac{v(N_C)}{2} \log n,$$

where $\log p(x|\hat{\theta}; N_C)$ is the likelihood of the estimated parameters, $p(\hat{\theta}; N_C)$ is the probability a priori of the estimated parameters, and $v(N_C)$ is the number of free parameters of the model, which is given by:

$$v(N_C) = \underbrace{N_C - 1}_{\pi^{(C)}} + \underbrace{N_C(N_U - 1)}_{\pi^{(U)}} + \underbrace{N_U(N_K - 1)}_{\pi^{(K)}} + ,$$

$$\underbrace{N_C\left(\sum_{k=1}^{N_K}\sum_{d=1}^{N_D} f_{kd} - N_K\right)}_{\pi^{(D)}}$$

where each term in the sum represents the dimension of the space of conditional probability tables over which the corresponding parameter ranges. The last term of the sum accounts for the constraint induced by the boolean matrix f on the device parameter $\pi^{(D)}$. The selected number of clusters $\widehat{N_C}$ (at 528 in FIG. 5B) is the one that maximizes the BIC solution such that:

$$\hat{N}_C = \underset{N_C}{\operatorname{argmax}} BIC(N_C).$$

At 207 in FIG. 2, an initial number of job clusters $N_C^o$ is selected (which are received at 502 in FIG. 5A, together with usage data recorded at 201 and the determined range of service classes at 206). In one embodiment, to compute a set of models with different complexities $N_C$, parameters $\tilde{\theta}^{N^o}$ of the probability model defined at 204 are initialized with a relatively large complexity (at 504 in FIG. 5A).

Given the initial number of clusters $N_C^o$ (selected at 207) and the initialized parameters $\tilde{\theta}^{N_C^o}$, which are used to initialize $N_C$ and $\tilde{\theta}^{N_c}$ (at 506 in FIG. 5A, respectively), the BIC solution is decreased step-by-step until only one cluster remains (at 526 in FIG. 5B). For each intermediate step (iterated starting at 514 in FIG. 5A), the MAP obtained by using EM to estimate the parameters of the probability model (at 518 in FIG. 5B), and a BIC score is computed for the estimated parameters (at 520 in FIG. 5B). Instead of reinitializing the parameters of the probability model at each iteration, for level c the BIC solution uses c+1 different parameter initializations that are obtained (at 516 in FIG. 5B) by normalizing modified parameters after removing one cluster from the model learnt at level c+1 (at 514 in FIG. 5A). In effect, job data associated with each removed cluster (at 514 in FIG. 5A) is distributed to the remaining clusters (at 516 in FIG. 5B). After each iteration, the estimated parameters $\hat{\theta}^{N_C^{-1}}$ of the probability model (at 518 in FIG. 5B) with the highest computed BIC score (at 520 in FIG. 5B) is recorded (at 512 in FIG. 5A and 522 in FIG. 5B) together with its estimated number of clusters $N_c$ (at 524 in FIG. 5B) as the model learnt at level c+1.

An alternative embodiment for finding the appropriate number of clusters $N_C$ is to use simulated annealing or deterministic annealing type methods based on a stochastic birth and death process. This alternative embodiment iterates through the most probable solutions and stops at the global maximum with a high probability (for additional background see the following publication which is incorporated herein by reference in its entirety: T. Hofmann and J. Buhmann, "Pairwise data clustering by deterministic annealing", IEEE Transactions on Pattern Analysis and Machine Intelligence, 19(1):1-14, 1997). This alternative embodiment may use a criterion which is closely related to the BIC solution to decide birth and death of clusters.

B.5 Parameter Estimation Initialization

With reference again to FIG. 5A, the previous section discusses how the EM initialization for c clusters is obtained from the EM estimation with c+1 clusters. This process is initialized, by (i) an initial, large, value $N_C^o$ for the number of clusters (at 502 and 506) and (ii) an initialization $\theta^o$ of the parameters of the probability model for that value (at 504 and 506). The choice of this first initialization is important, as the estimation of the device parameters $\pi_{dck}^{(D)}$ in the subsequent EM-steps may get caught in local maxima, which may be avoided by using the following heuristic procedure for initializing the parameters $\theta^o$ and number of clusters $N_C^o$.

At 207 in FIG. 2, the number of initial job clusters $N_C^o$ is selected by letting $n_{ud}$=card$\{i|u_i=u, d_i=d\}$ equal the count of jobs for each user-device pair. For each user u and service class k, the primary device $r_{ku}$ is defined as the device offering service class k which was most used by user u:

$$r_{ku} = \underset{d=1,\ldots,N_D}{\operatorname{argmax}} n_{ud} f_{kd}.$$

The vector $r_u$ is called the primary device profile of user u. Initially, one cluster is defined for each vector of $N_K$ devices, which is the primary device profile of at least one user u, and which may be given by:

$$N_C^o = \operatorname{card}\{r_u|u=1, \ldots, N_U\},$$

and where each cluster $c=1,\ldots N_C^o$ corresponds to a distinct vector $d_c$ of $N_D$ devices which is the primary device profile of at least one user. The number of users who have adopted the vector $d_c$ as their primary device profile may now be defined as $h_c$=card$\{u|r_u=d_c\}$, which by construction $h_c$ is never null.

At 504 in FIG. 5A, the initial job cluster parameter $\pi^{(C)^o}$ is defined as the proportion of users who have adopted $d_c$ as primary device profile, which may be given by:

$$\pi_c^{(C)^o} = \frac{h_c}{N_U}.$$

At 504 in FIG. 5A, the initial user parameter $\pi^{(U)^o}$ is given by:

$$\pi_{uc}^{(U)^o} = \frac{1-\varepsilon}{h_c}I_{\{r_u=d_c\}} + \frac{\varepsilon}{N_U - h_c}I_{\{r_u \neq d_c\}},$$

which provides that within a cluster c, the $h_c$ users who have adopted device $d_c$ as their primary device profile are equally probable with a high probability, while the others are also equally probable with a low probability (where $\mathbb{I}_{\{x\}}=1$ iff x is true, otherwise $\mathbb{I}_{\{x\}}=0$). In one embodiment, the coefficient $\varepsilon$ is, for example, assigned an initial value equal to 0.001.

At 504 in FIG. 5A, the initial class parameter $\pi^{(K)^o}$ is given by:

$$\pi_{ku}^{(K)^o} = \frac{m_k}{\sum_{k'=1}^{N_K} m_{k'}},$$

with $N_K$ hyper-parameters $(m_k)_{k=1,\ldots,N_K}$, which reflects the a priori knowledge on the distribution of service classes for all the users as discussed above.

At 504 in FIG. 5A, the initial device parameter $\pi^{(D)^o}$ is given by:

$$\pi_{dck}^{(D)^o} = (1-\varepsilon)I_{\{d=d_{ck}\}} + \frac{\varepsilon}{N_D - 1}I_{\{d \neq d_{ck}\}},$$

which reflects that, for a job of service class k within a cluster c, a user tends to choose the primary device for that service class defined by that cluster with a high probability, and any of the other devices with a low probability.

B.6 Parameter Estimation

In learning the parameters $\hat{\theta}$ of the probability model at 508 and 518 in FIG. 5B, EM iterates over equations [4], [5], [6], [7], and [8], which are given below, after being initialized as set forth at 504 and 516, respectively. Iteration over equations [4], [5], [6], [7], and [8] terminates when the change in the value of parameters between the iterations is less than a given threshold. Accordingly, EM is used to maximize the posterior distribution and then obtain the point-wise estimator $\hat{\theta}$. The E-step of EM at time t is given by the following equation, where the expected complete likelihood is used to compute joint probabilities of the parameters, as follows:

$$Q(\theta) = \sum_{c=1}^{N_C}\sum_{k=1}^{N_K}\sum_{i=1}^{n} w_{ick} \log p(u_i, d_i, c_i = c, k_i = k \mid \theta), \quad [4]$$

where $$w_{ick} = \frac{p(u_i, d_i, c_i = c, k_i = k \mid \theta^{old})}{\sum_{c'=1}^{N_C}\sum_{k'=1}^{N_K} p(u_i, d_i, c_i = c', k_i = k' \mid \theta^{old})}.$$

Subsequently, equations [5], [6], [7], and [8] specify the M-steps of EM as follows at time t+1 (i.e., use the estimated values at time t to re-compute the values at time t+1), where the maximization of $\theta^{new}=\arg\max_\theta Q(\theta)$ leads to the update scheme:

$$\pi_c^{(C)} = \frac{\sum_{k,i} w_{ick}}{\sum_{k,c',i} w_{ic'k}}, \quad [5]$$

$$\pi_{uc}^{(U)} = \frac{\sum_{k,i} w_{ick}I\{u_i = u\} + m_k}{\sum_{k,c',i} w_{ick'}I\{u_i = u\} + \sum_{k'} m_{k'}}, \quad [6]$$

$$\pi_{ku}^{(K)} = \frac{\sum_{c,i} w_{ick}I\{u_i = u\}}{\sum_{k',c,i} w_{ick'}I\{u_i = u\}}, \quad [7]$$

$$\pi_{dck}^{(D)} = \frac{\sum_{c,i} w_{ick}I\{d_i = d\} + I\{f_{kd} = 1\}}{\sum_{d',c,i} w_{ick'}I\{d_i = d'\}I\{f_{kd'} = 1\}}. \quad [8]$$

Figure 6:
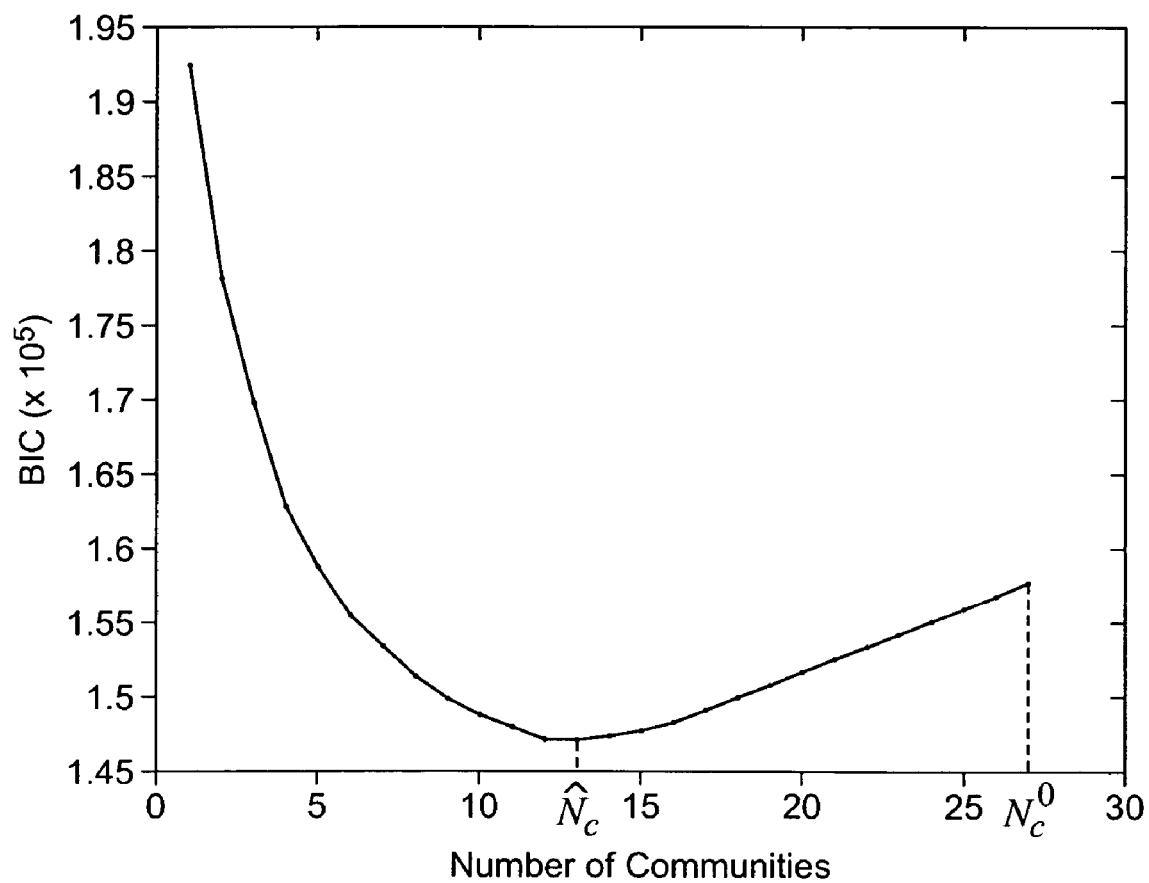
FIG. 6 illustrates an example of a graph of the iterative computation of BIC scores of the model for various number of clusters.

FIG. 6 illustrates an example of a graph of the iterative computation of BIC scores of the model for various number of clusters in accordance with the method outlined in FIGS. 5A and 5B. In the graph shown in FIG. 6, computed BIC scores for estimated parameters are plotted against the estimated number of clusters (or communities), where the selected initial number of clusters $N_C^o$ is equal to 27, and the optimum BIC score occurs when $\widehat{N_C}$ is equal to 13 clusters.

C. Using The Estimated Probability Model

Once the parameters $\hat{\theta}$ of the probabilistic model together with the number of clusters $N_C$ are estimated (at 202 in FIG. 2), they may be used in applications for assessing the infrastructure (at 210), which includes use of smoothed data at 214 and use of the estimated parameters $\hat{\theta}$ at 216.

C.1 Use of Smoothed Data in Applications

In one application for assessing the infrastructure at 214, the estimated parameters of the probability model are used to generate smoothed data at 212. That is at 214, any statistic computed from the raw data n___ (i.e., recorded job usage data at 201) may be applied to the smoothed data n___*, yielding more precise information.

The raw data may be smoothed at 212 by considering an outlier is a user whose usage profile observed in the recorded job usage data does not match its expected value by the estimated parameters of the probability model. As set forth above, the raw usage data recorded at 201 is given by matrix $n_{ud}$ which sets forth the number of jobs involving users u and device d, which is the realization of the random variable $X_{ud}=\Sigma_{i=1}^{n}\mathbb{I}\{U_i=u, D_i=d\}$ with expectation $n_{ud}^*$ according to the probability model that may be given by:

$$n_{ud}^*=\Sigma_{i=1}^{n}E_{\hat{\theta}}[\mathbb{I}\{U_i=u, D_i=d\}|\hat{\theta}]=np(U=u, D=d|\hat{\theta}),$$

where n___* is the smoothed version of n___ in which information orthogonal to the model space is considered noise and eliminated.

In one embodiment, outliers are computed by defining a quality-of-fit measure for each user and then finding those users above a given threshold. Standard chi-squared statistic may be used to test if the actual usage of the devices fits the usage estimated by the model. This statistic may be viewed as a normalized distance between the expected quantities $n_{ud}^*$ and the observed data $n_{ud}$, which may be given by:

$$\chi_u^2 = \sum_{d=1}^{N_D} \frac{(n_{ud}^* - n_{ud})^2}{n_{ud}^*},$$

where a user is considered as outlier as soon as $\chi_u^2$ is superior to the inverse cumulative distribution of the chi-squared law with $N_D$-1 degrees of freedom. In alternate embodiments, other types of outliers besides users may be considered such as devices.

Once the raw data n is smoothed to produce a smoothed data $n^*$ at 212, the smoothed data may be used singly or in combination with the raw data in applications at 214, some of which are discussed below. Generally, the applications identify outliers for observed data (such as users and machines) and evaluate the actual value versus the expected value to identify possible anomalies.

C.1.1 Identifying Outliers

At 214A, outliers are identified in order to help system administrators understand individual user needs that are not provided for by an existing configuration of the infrastructure. That is at 214A, outliers are identified that do not fit within the probability model, thereby allowing abnormal use or misuse of the infrastructure (e.g., a user that prints to color printer, black and white jobs) to be identified and corrected by system administrators.

C.1.2 Correction of Primary Devices

At 214B, primary device changes are assessed by comparing the primary device of a user u for a service class k (as defined above in section B.5), which is defined from the raw data as:

$$r_{ku} = \arg\max_d n_{ud} f_{kd},$$

with its smoothed counterpart estimated by the model, which is defined as:

$$r_{ku}^* = \arg\max_d p(U=u, D=d \mid K=k, \hat{\theta}),$$

where the users for which $r_{ku} \neq hd\ ku^*$ have a non-standard behavior are identified as of possible interest to system administrators. Those users identified as having non-standard behaviors may identify one or more issues with the user that the system administrator may want to address, such as (i) the user is operating devices in the infrastructure with insufficient knowledge about the devices that are available (e.g., a user lacks information about the location of printers), (ii) a device is out of order (e.g., a printer is indicating that it is operating properly yet produces poor quality prints).

C.1.3 Visualization of the Infrastructure

At 214C, clusters are inferred for visualizing the infrastructure, which may take the form of a low dimensional representations of the infrastructure (e.g., a two dimensional map). Even if such a map may not correspond exactly to the map of the physical setting, it may provide a system administrator with a synthetic view of the overall infrastructure usage. Known techniques, such as Principal Component Analysis (PCA), Kernel PCA, or Sammon's Mapping, may be used to derive low dimensional representations from high-dimensional data sets (i.e., dimension reduction solutions). It is thus possible to draw a map of users and devices based on smoothed data $n^*$ instead of raw data n. Advantageously, the use of a smoothed data over the raw data may increase precision and clarity of the map, while at the same time being less impacted by dimension reduction solutions that are sensitive to outliers.

In the dimension reduction technique referred to above as Sammon's Mapping, a non-linear dimensionality reduction is performed (for further background see the following publications which are incorporated herein by reference in their entirety: B. D. Ripley, "Pattern Recognition and Neural Networks", Cambridge University Press, 1996; and J. W. Sammon, "A nonlinear mapping for data structure analysis", IEEE Transactions on Computers, 18(5):401-409, 1969). The Sammon's Mapping dimension reduction technique aims at representing data points with the minimum relative distance distortion between them. If $\delta_{ij}$ is the distance between two points in the original space and $\Delta_{ij} = \|x_i - x_j\|$ is the distance in the reduced space (two dimensions), then the measure of distortion may be given by:

$$E(d) = \frac{1}{\sum_{i<j} \delta_{ij}} \sum_{i<j} \frac{(\delta_{ij} - \Delta_{ij})^2}{\delta_{ij}}.$$

C.1.4 Estimating Redirections in the Infrastructure

At 214D, a redirection matrix of the infrastructure is computed. The redirection matrix may be defined to provide a device choice distribution for each device d, in the event d becomes unavailable. In one embodiment, a redirection matrix may be computed for each of the $N_K$ service classes of a device. For a user u, a device d and a service class k, the raw data and the a priori knowledge may be used to compute a raw estimate of the number of jobs of service class k involving user u and device d as:

$$n_{udk} = n_{ud} \frac{m_k f_{kd}}{\sum_{k'=1}^{N_K} m_{k'} f_{k'd}},$$

for which a smoothed estimate may be given by:

$$n_{udk}^* = np(U=u, D=d, K=k \mid \hat{\theta}).$$

Accordingly, methods that compute a redirection matrix from the raw data n may now be applied to the smoothed data $n^*$. In one embodiment, the methods for computing a redirection matrix, as disclosed in U.S. patent application Ser. No. 11/013,322, entitled "Automated Job Redirection And Organization Management", which is incorporated herein by reference in its entirety, are computed using the smoothed data $n^*$. In another embodiment, the redirection matrix is computed using the smoothed data $n^*$ (or using raw data n) with the following equation:

$$R_{dd'k} = \frac{\sum_u n_{udk} n_{ud'k} I\{d \neq d'\}}{\sum_{u,d''} n_{udk} n_{ud''k} I\{d \neq d''\}},$$

which provides that the choice of redirection device d' is conditional on initial device d following a multinomial distribution with parameters proportional to $n_{ud}I\{d \neq d'\}$.

C.2 Use of Estimated Parameters in Applications

Referring again to 216 in FIG. 2 which concerns an application for using estimated parameters of the probability model, FIG. 7 illustrates an example summary of estimated parameters for job clusters, in which 13 clusters have been identified in the column "cluster". In the columns "B&W printer" and "color printer" of FIG. 7, the black and white (B&W) printer and color printer are the printers that are used the most in each cluster, where the percentage indicates how often this "preferred" printer is chosen in each cluster, as given by the device parameter $\pi_{dck}^{(D)}$. In FIG. 7, the "%" column sets forth the probability of each cluster given by the job cluster parameter $\pi_c^{(C)}$, where the main users of the devices are set forth in the column "user IDs (% of usage)" with the percentage of launched jobs as given by the user parameter $\pi_{cu}^{(U)}$.

It will be observed by, for example, a system administrator reviewing the estimated parameters of an infrastructure set forth in FIG. 7 that: (a) among the 13 clusters, the first four define B&W printer and color printer pairs that represent nearly 50% of all jobs; (b) each cluster is dominated by a "preferre" printer (e.g., in cluster C2, 100% of all jobs are sent to printers Stu and Lib, for all B&W and color printing, respectively); (c) cluster C4 indicates non-standard use of color printing among users as it is split between printer Rep at 52% and printer Lib at 48% (not shown in data in FIG. 7); (d) clusters C3 and C12 contain color printers among the B&W clusters (not shown in data in FIG. 7), which indicates that the color printer is likely being used as a black and white printer when the closest black and white printer is unavailable; and (e) cluster C12 is composed of only one user, which indicates that the user may have specific responsibility or requirements for using the infrastructure.

In one application for assessing the infrastructure at 216A, the estimated job clusters (shown for example in FIG. 7) are used for configuring user setting in the infrastructure. In this application, a new user may be associated with a known user having a similar geographic location and/or similar device requirements. Once associated, the new user may be assigned as a default those preferred settings associated with that group of users (e.g., the default B&W printer and color printer may be initialized as default printers in the users computing environment).

D. Miscellaneous

To recapitulate, there has been disclosed a method for analyzing usage data of a shared device infrastructure that includes a set of users with access to a set of devices offering services of multiple classes. Each interaction between user and device specifies a job that is characterized by two observed variables, a user variable and a device variable, and two latent (or unobserved) variables, a job cluster variable and a job service class variable. Parameters of a probabilistic latent model of dependencies between the four variables are estimated. The model and smoothed usage data may then be used in various applications such as, outlier detection, and infrastructure evaluation.

Advantageously, the probability model provides a small number of relevant usage patterns which "compress" the probability distribution into a small number of parameters, instead of studying each user profile individually. A further advantage of the probability model is that it takes into account device functionalities, without assuming specific functionality required for each job that is observed.

Those skilled in the art will recognize that a general purpose computer may be used as an apparatus for implementing the probabilistic latent analysis system 110 shown in FIG. 1 and described herein. Such a general purpose computer would include hardware and software. The hardware would comprise, for example, memory (ROM, RAM, etc.) (e.g., for storing processing instructions of the probabilistic latent analysis system detailed in FIGS. 2 and 5, and usage job log data), a processor (i.e., CPU) (e.g., coupled to the memory for executing the processing instructions of the probabilistic latent analysis system), persistent storage (e.g., CD-ROM, hard drive, floppy drive, tape drive, etc.), user I/O, and network I/O. The user I/O may include a camera, a microphone, speakers, a keyboard, a pointing device (e.g., pointing stick, mouse, etc.), and the display. The network I/O may for example be coupled to a network such as the Internet. The software of the general purpose computer would include an operating system and application software providing the functions of the system 100.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A computer-implemented method for estimating parameters of a probability model that models user behavior of shared devices offering different classes of service for carrying out jobs to generate clusters of users with similar behavior for each class of service in a network of shared devices offering different classes of service, comprising:

recording usage job data of observed users and devices carrying out the jobs;

defining a probability model with an observed user variable, an observed device variable, a latent job cluster variable, a latent job service class variable, and the dependencies among the observed user variable, the observed device variable, the latent job cluster variable, and the latent job service class variable including a dependency of the latent job service class variable to the observed device variable constrained by knowledge of the service classes supported by devices;

wherein the distribution of the devices is constrained by the knowledge of the service classes they support, and wherein defining a probability model according to generating the job cluster index, which has no dependencies, generating the user id, which is dependent on job clusters, generating the job service class, which is dependent on the user, generating the device choice, which is dependent on the job clusters and the job service classes;

determining a range of service classes associated with the shared devices;

selecting an initial number of job clusters;

learning parameters of the probability model using the recorded job usage data, the determined range of service classes, and the selected initial number of job clusters, wherein the latent job cluster variable and the latent job service class variable are learned together; and applying the learned parameters of the probability model to evaluate one or more of: configuration of the shared devices, use of the shared devices, and job redirection between the shared devices.

2. The method according to claim 1, wherein said applying further comprises using the probability model with the learned parameters to smooth the recorded usage data.

3. The method according to claim 1, wherein said learning further comprises:

estimating the parameters of the probability model for a plurality of different numbers of job clusters ranging from the initial number of job clusters to a number greater than one;

computing a score for the parameters of the probability model estimated for each of the plurality of different numbers of job clusters;

selecting the parameters of the probability model with the highest computed score.

4. The method according to claim 1, wherein the probability model is given by the following equation:

$$p(U, D, C, K) = p(C)p(U|C)p(K|U)p(D|C, K),$$

where:

U is the observed user variable;

D is the observed device variable;

C is the latent job cluster variable, which corresponds to an index of a job cluster;

K is the latent job service class variable, which corresponds to a job's service class.

5. The method according to claim 4, wherein parameters of the probability model $p(C)$, $p(U|C)$, $p(K|U)$, and $p(D|C, K)$ are estimated by computing a maximum of a posteriori probability where a priori knowledge is defined using uniform priors.

6. The method according to claim 1, wherein a priori knowledge is defined using informative priors that are a percentage of jobs in each class of service in the range of service classes associated with the shared devices.

7. The method according to claim 1, wherein the devices are multifunctional devices.

8. The method according to claim 7, wherein the jobs performed by the multifunctional devices comprise one of scanning, printing, faxing, archiving, and emailing.

9. The method according to claim 8, wherein the range of service classes associated with the shared devices is a set of multi-class services for the multifunctional devices.

10. The method according to claim 9, wherein the set of multi-class services for printing is one or more of color, speed, and quality.

11. An apparatus for estimating parameters of a probability model that models user behavior of shared devices offering different classes of service for carrying out jobs, comprising:

a memory for storing processing instructions of the apparatus; and a processor coupled to the memory for executing the processing instructions of the apparatus; the processor in executing the processing instructions:

recording usage job data of observed users and devices carrying out the jobs;

defining a probability model with an observed user variable, an observed device variable, a latent job cluster variable, a latent job service class variable, and the dependencies among the observed user variable, the observed device variable, the latent job cluster variable, and the latent job service class variable including a dependency of the latent job service class variable to the observed device variable constrained by knowledge of the service classes supported by devices;

wherein the distribution of the devices is constrained by the knowledge of the service classes they support, and wherein defining a probability model according to generating the job cluster index, which has no dependencies, generating the user id, which is dependent on job clusters, generating the job service class, which is dependent on the user, generating the device choice, which is dependent on the job clusters and the job service classes;

determining a range of service classes associated with the shared devices;

selecting an initial number of job clusters;

learning parameters of the probability model using the recorded job usage data, the determined range of service classes, and the selected initial number of job clusters, wherein the latent job cluster variable and the latent job service class variable are learned together; and applying the learned parameters of the probability model to evaluate one or more of: configuration of the shared devices, use of the shared devices, and job redirection between the shared devices.

12. The apparatus according to claim 11, wherein the processor in executing said applying processing instruction uses the probability model with the learned parameters to smooth the recorded usage data.

13. The apparatus according to claim 11, wherein the processor in executing said learning processing instruction:

estimates the parameters of the probability model for a plurality of different numbers of job clusters ranging from the initial number of job clusters to a number greater than one;

computes a score for the parameters of the probability model estimated for each of the plurality of different numbers of job clusters;

selects the parameters of the probability model with the highest computed score.

14. The apparatus according to claim 11, wherein the probability model is given by the following equation in processing instruction:

$$p(U, D, C, K) = p(C)p(U|C)p(K|U)p(D|C, K),$$

where:

U is the observed user variable;
D is the observed device variable;
C is the latent job cluster variable, which corresponds to an index of a job cluster;
K is the latent job service class variable, which corresponds to a job's service class.

15. The apparatus according to claim 14, wherein parameters of the probability model $p(C)$, $p(U|C)$, $p(K|U)$, and $p(D|C, K)$ are estimated in the processing instruction by computing a maximum of a posteriori probability where a priori knowledge is defined using uniform priors.

16. The apparatus according to claim 11, wherein a priori knowledge is defined in the processing instruction using informative priors that are a percentage of jobs in each class of service in the range of service classes associated with the shared devices.

17. The apparatus according to claim 11, wherein the devices are multifunctional devices.

18. An article of manufacture for estimating parameters of a probability model that models user behavior of shared devices offering different classes of service for carrying out jobs, the article of manufacture comprising computer usable media including computer readable instructions embedded therein that causes a computer to perform a method, wherein the method comprises:

recording usage job data of observed users and devices carrying out the jobs;

defining a probability model with an observed user variable, an observed device variable, a latent job cluster variable, a latent job service class variable, and the dependencies among the observed user variable, the observed device variable, the latent job cluster variable, and the latent job service class variable including a dependency of the latent job service class variable to the observed device variable constrained by knowledge of the service classes supported by devices;

wherein the distribution of the devices is constrained by the knowledge of the service classes they support, and wherein defining a probability model according to generating the job cluster index, which has no dependencies, generating the user id, which is dependent on job clusters, generating the job service class, which is dependent on the user, generating the device choice, which is dependent on the job clusters and the job service classes;

determining a range of service classes associated with the shared devices;

selecting an initial number of job clusters;

learning parameters of the probability model using the recorded job usage data, the determined range of service classes, and the selected initial number of job clusters, wherein the latent job cluster variable and the latent job service class variable are learned together; and applying the learned parameters of the probability model to evaluate one or more of: configuration of the shared devices, use of the shared devices, and job redirection between the shared devices.

* * * * *